Nov. 20, 1923

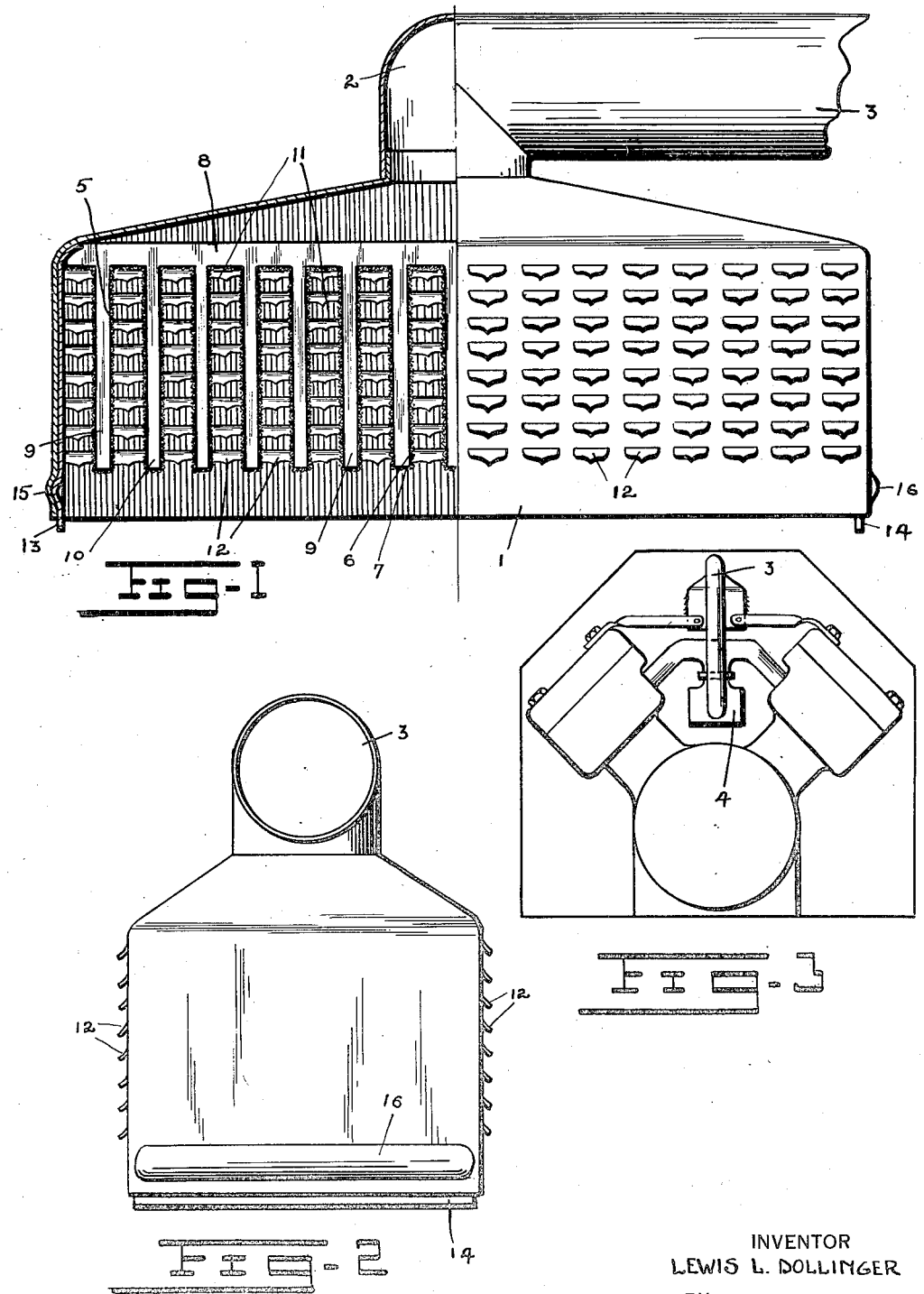

L. L. DOLLINGER

AIR FILTER

Filed July 24, 1922

INVENTOR
LEWIS L. DOLLINGER

BY
*Frank Keiper*
ATTORNEY

Patented Nov. 20, 1923.

1,474,412

UNITED STATES PATENT OFFICE.

LEWIS L. DOLLINGER, OF ROCHESTER, NEW YORK.

AIR FILTER.

Application filed July 24, 1922. Serial No. 577,040.

*To all whom it may concern:*

Be it known that I, LEWIS L. DOLLINGER, a citizen of the United States of America, residing at Rochester, in the county of Monroe and State of New York, have invented certain new and useful Improvements in Air Filters, of which the following is a specification.

The object of this invention is to provide an improved form of air filter for filtering the air which passes into the carburetor so that the air will not carry any solid matter into the cylinder causing wear and excess carbon deposits.

Another object of this invention is to make the ratio of the filtering area to the capacity of the filter so that the velocity of the air passing through the filter is reduced to a minimum.

These and other objects of this invention will be fully illustrated in the drawings, described in the specification and pointed out in the claims at the end thereof.

In the accompanying drawings:

Figure 1 is a partial side elevation and longitudinal section of my improved filter.

Figure 2 is an end elevation of the filter.

Figure 3 is a diagrammatic end view of a V type of engine showing the location of the air filter when applied to this type of engine.

In the several figures of the drawing, like reference numerals indicate like parts.

Figure 4:
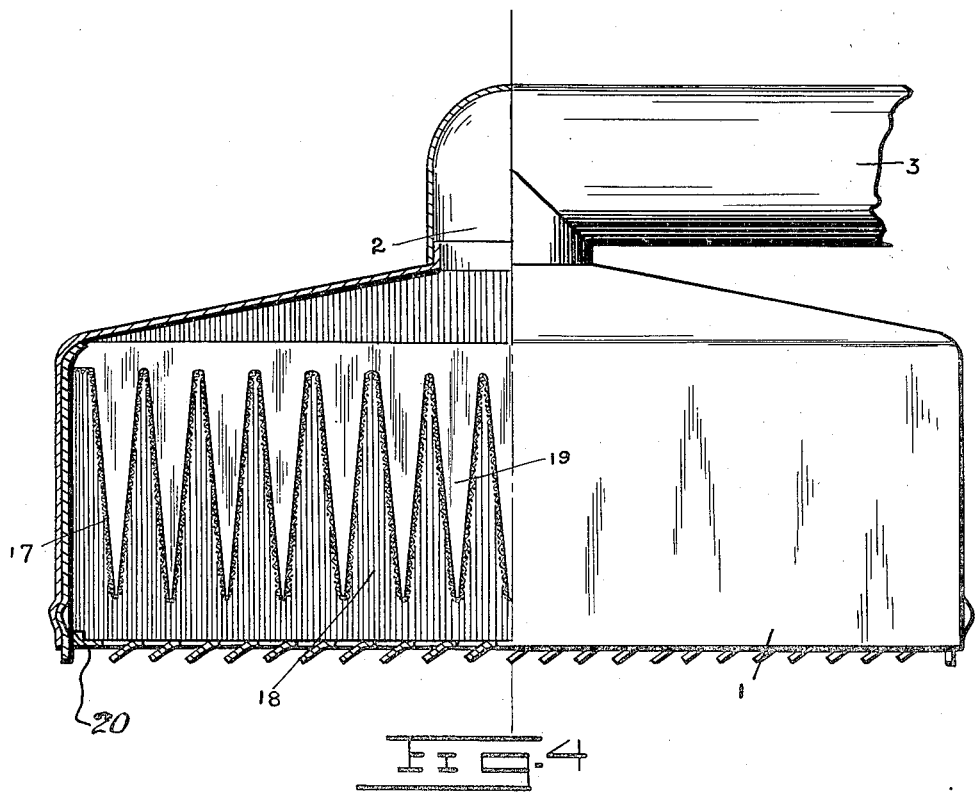
Figure 4 is a partial side elevation and longitudinal section of a modified form of air filter.

Air filters for internal combustion engines are used to remove the dust, sand, grit and other abrasive from the air entering the carburetor. This solid matter floating in the air is usually picked up when driving over dusty or sandy roads. In the case of trucks used for hauling material which cause dust and dirt during the loading and unloading of it the air filter protects the engine from the dust impregnated air with which it is surrounded, by separating the solid matter from the air before it enters the carburetor and cylinders. It has been found that the road dust, sand and grit entering the motor through the intake of the carburetor is the principal cause of wear on a motor vehicle engine.

In my present invention which is an improvement over the filter described in my prior Patent No. 1,359,879 issued November 23, 1920, the casing 1 is made rectangular in the form of a long inverted trough that is closed at the ends. The top of the casing slightly inclines toward the center thereof from all sides and ends and terminates into the outlet opening 2. From this outlet a suitable pipe 3 leads to the intake of the carburetor 4 as illustrated in Figure 3 to convey the filtered air thereto.

The filtering screen 5 mounted in the casing 1 is made up of a series of vertical folds or pockets formed parallel to one another. These folds or vertical pockets are bent up of a continuous strip of wire screen 6 which is covered on the outside with a strip of filtering cloth 7. The sides and ends of this filtering screen are supported by a frame made up of the sides 8 having the depending fingers 9 formed thereon. The filtering screen 5 is bent so that its sides fold over the depending fingers 9 and close the ends of the vertical pockets 10 that are open at the top and terminate into the space below the inclined top of the casing 1. As the filtering cloth is fastened to the screen on the under side thereof the dirt and grit separated from the air when passing through the filter collects on the outside of the vertical pockets 10 so that it can shake loose from the filtering cloth and drop off therefrom and out through the open bottom of the casing. The inverted vertical pockets 11 formed by the filtering screen adjacent to each of the vertical pockets 10 are left open on the ends and the sides of the casing 1 are perforated with vertical rows of openings 12 that are in line with these open ends of the inverted vertical pockets 10 of the filtering screen.

This permits air to be drawn through the sides of the casing 1 as well as the open bottom thereof, which increases the volume of air that can be drawn through the filter which together with the large filtering area formed by the screen results in a corresponding reduction in the velocity of the air that passes through the filter. This result as pointed out in my prior patent above referred to will cause the solid matter to partially separate from the air by gravity so that the remainder can be more easily separated when the air passes through the filtering screen.

The sides 8 and their fingers 9 for supporting the filtering screen 5 are supplemented by the ends 13 and 14. These ends together with the sides 8 and fingers 9 form a frame which support the filtering screen within the casing 1. For the purpose of holding this frame in place within the casing 1 the ends thereof as well as the ends 13 and 14 have interlocking depressions 15 and 16 struck up thereon which can be readily engaged or disengaged from each other when it is desired to remove and replace the filtering screen in the casing 1.

In Figure 4 I have shown a slightly modified form of the air filter. In this form the filtering screen 17 is made by forming it into a series of vertical pockets having conical sides and ends. The two series of pockets formed in this way, the inverted pockets 18 opening into the bottom of the casing, and the upright pockets 19 opening into the closed top of the casing allow the air to enter and pass out in the same way as the pockets in the filter illustrated in Figure 1. The bottom of the filter illustrated in Figure 4 is provided with a baffle plate 20. This baffle plate is suitably supported underneath the filtering screen and the small flanges struck up to form the openings in this baffle plate are made to slant toward one end of the casing 1.

This type of filter is especially designed to be used for filtering the air for air pumps used in the air brake systems of street cars, etc. These air pumps are usually mounted underneath the car body and are exposed to the water and dirt splashing up from the tracks. The filter for such an air pump is, therefore, mounted so that the flanges of the baffle plate slant away from the direction in which the car is traveling. This then deflects the water and dirt splashing against the baffle plate and prevents it from entering the inside of the casing and from coming in contact with the filtering screen.

I claim:

1. In an air filter, the combination of a casing having its bottom open and its top closed, a filtering screen mounted within said casing, said filtering screen being arranged in folds or pockets, said folds or pockets being alternately open toward the top and bottom of said casing, a discharge duct leading from the closed top of said casing the sides of said casing having openings into the ends of the pockets that are open at the bottom.

2. In an air filter, the combination of a casing having an open bottom and a closed top, a frame within said casing, end spacing members provided in said frame, a filtering screen supported by said end spacing members, and means to hold said frame with its screen in said casing.

3. In an air filter, the combination of a casing having an open bottom and a closed top, a frame comprising sides and ends within said casing, depending fingers formed on the sides of said frame, a filtering screen folded over said fingers of said sides and supported between said fingers, and means to support said frame within said casing.

4. In an air filter, the combination of a casing having a closed top, sides and ends, an outlet in the top of said casing, angular deflecting flanges on one side of the openings; in said cover plate, a cover plate having openings therein in the bottom of said casing, a filtering screen in said casing interposed between said deflecting plate in the bottom and said outlet in the top of said casing, said filtering screen being formed by a series of vertical pockets alternately open to the top and bottom of said casing.

5. In an air filter, the combination of a casing, a top for said casing, said top slanting from the sides and ends to a common elevated center, an outlet leading out of said elevated center of said top, a vertically disposed zig zag filtering screen mounted in said casing intermediate of the top and bottom thereof, said sides of said casing having openings provided therein that lead into the ends of said zig-zag filtering screen to allow air to enter said casing below the filtering surface of said filtering screen.

6. In a filter, the combination of a rectangular casing, a top for said casing having an elevated central portion, said top slanting from the sides and ends to said central elevated portion of said top, an outlet leading from said elevated portion of said top, a skeleton frame mounted within said casing, a zig-zag shaped filtering screen suspended from said skeleton frame, means for locking said skeleton frame in place within said casing, a bottom for said casing, said bottom having openings therein, angular deflecting flanges on one side of the openings in said bottom, said deflecting flanges being adapted to deflect foreign matter thrown against said bottom from one direction.

In testimony whereof I affix my signature.

LEWIS L. DOLLINGER.